United States Patent [19]

Kaltenbach

[11] 4,262,564

[45] Apr. 21, 1981

[54] METHOD OF AND A DEVICE FOR THE ELIMINATION OF PLAY IN FEEDING MEANS OF A COLD-ACTION CIRCULAR SAW

[76] Inventor: Dieter Kaltenbach, Rebweg 33, 7850 Lörrach, Fed. Rep. of Germany

[21] Appl. No.: 55,006

[22] Filed: Jul. 5, 1979

[30] Foreign Application Priority Data

Jul. 7, 1978 [DE] Fed. Rep. of Germany ....... 2829856

[51] Int. Cl.³ ............................................. B23D 47/08
[52] U.S. Cl. ...................................... 83/56; 83/471.2; 83/490; 83/589; 409/146
[58] Field of Search ................... 83/471.2, 471.3, 490, 83/581.1, 589, 590, 56; 51/99; 409/146

[56] References Cited

U.S. PATENT DOCUMENTS

| | | | |
|---|---|---|---|
| 3,656,261 | 4/1972 | Everett | 83/490 X |
| 3,827,235 | 8/1974 | Ward et al. | 83/490 X |
| 4,036,092 | 7/1977 | Kaltenbach | 83/490 X |

*Primary Examiner*—J. M. Meister
*Attorney, Agent, or Firm*—Michael J. Striker

[57] ABSTRACT

The cold circular saw comprises a base with a saw table, a saw arm hinged to the saw table and supporting a power driven saw blade, a linear power transmitting mechanism hinged between the swingable saw arm and the stationary machine base to move the saw arm in the feeding direction, and a hydraulic cylinder-and-piston unit hinged between the machine base and the saw arm parallel to the feeding power transmitting mechanism to exert a positive biasing force in the direction opposite to the feeding direction, thus eliminating the play in the hinge of the saw arm and in the hinges of the feeding device.

19 Claims, 1 Drawing Figure

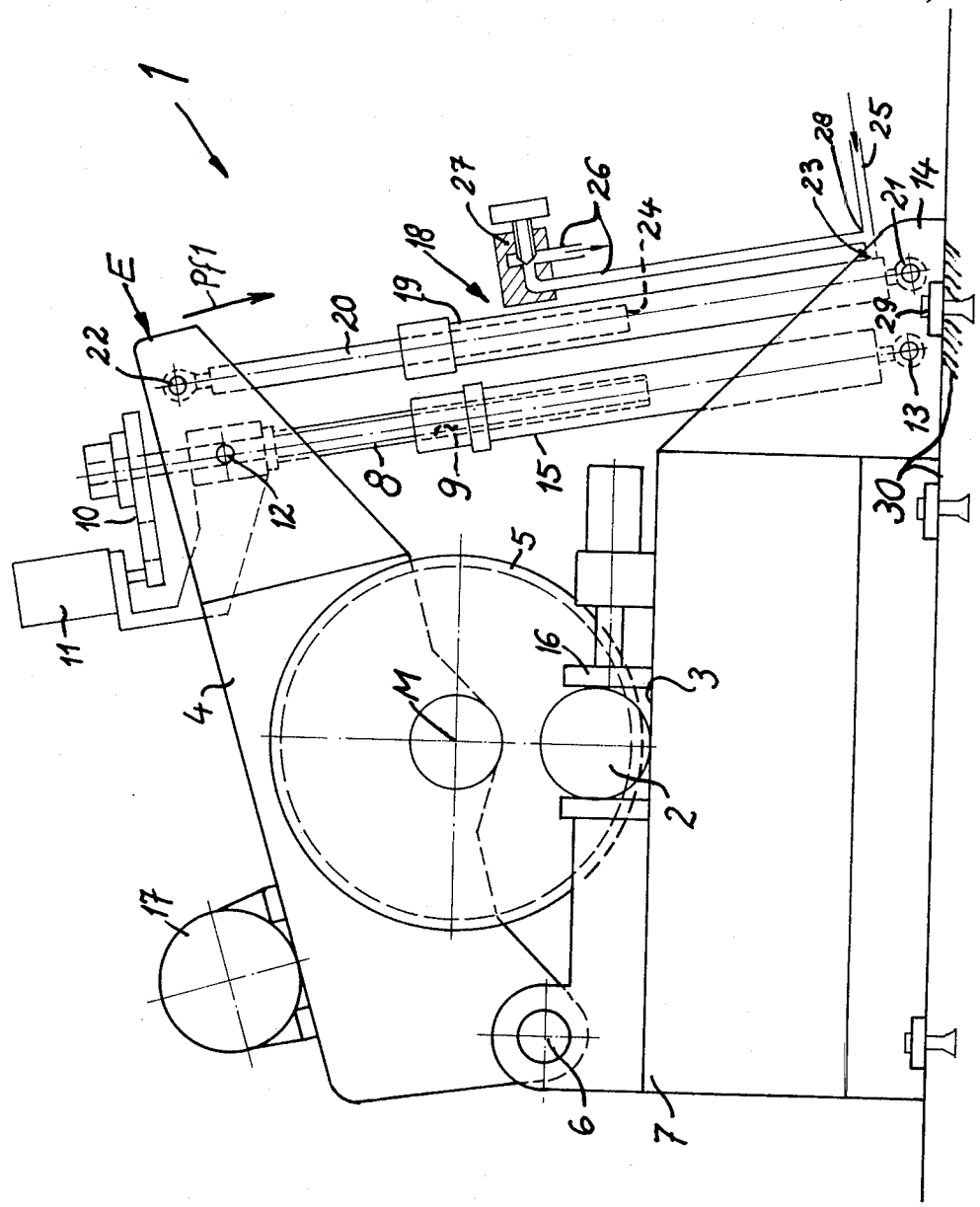

METHOD OF AND A DEVICE FOR THE ELIMINATION OF PLAY IN FEEDING MEANS OF A COLD-ACTION CIRCULAR SAW

BACKGROUND OF THE INVENTION

The invention relates generally to circular saws and more particularly it relates to a method of and a device for correcting play in mechanical feeding means for a cold action circular saw, particularly of the type having a swingable saw arm hinged to a saw table and a power transmitting mechanism constituted of two parts movable one against the other on a rectilinear path, such as for example a rack and pinion mechanism or a screw spindle mechanism with a nut or the like, is hinged between the free end of the saw arm and the socket of the machine base.

The rigidity of the feed or advance of the saw blade is especially in the case of cold action circular saws of greater importance for achieving both a high cutting efficiency and a long edge life of the saw blade. It is known to use hydraulic cylinder-and-piston units as feeding means, nonetheless in these hydraulic units vibrations can take place due to the elasticity of the pressure medium in the working cylinder and in the hoses. For this reason it is also known to use mechanical feeding means for feeding the saw blade, such as for example a screw spindle engaging nut, which similarly as the aforementioned hydraulic cylinder can be arranged between the socket of the machine base and the saw arm of the cold action circular sawing machine. These mechanical feeding means considerably improve the rigidity of the feeding drive.

In the feeding device for the saw blade of a cold action circular saw, the movable connecting piece between the socket and the saw arm is intermittently subject to a pressure load and also to a tension load. The pressure load results due to the weight of the saw arm. Moreover, due to the cutting forces taking place on the saw teeth and due to their components formed by the inclination of the teeth, there temporarily result further pressure forces, and also temporary additional tension forces. If the movable connecting members of the feeding means are not completely rigid, these forces may cause vibrations and chatter in the saw blade resulting in an excessive wear of the latter.

Even when using as a feeding means a spindle in engagement with a rolling ball nut, the aforementioned danger is not always excluded, since the hinges and also the ball nut are not without play. The backlash free adjustment of these different parts of the mechanical feeding device requires, however, additional expenditures and from time to time also necessitates a corresponding after adjustment.

SUMMARY OF THE INVENTION

It is, therefore, a general object of the present invention to overcome the aforementioned disadvantages.

More particularly, it is an object of the invention to provide a method in the circular saw of the above described type by which the readjustment of hinges and feeding elements in order to eliminate the backlash, can be dispensed with.

Another object of this invention is to provide a cold action circular saw in which the sawing process remains ineffected by play which may occur in the feeding means.

In keeping with these objects, and others which will become apparent hereafter, one feature of the invention resides, in a cold action circular saw having mechanical feeding means in subjecting the saw arm to a tensioning counterforce which, in addition to the resistance of the workpiece acts on the feeding elements and their hinge joints with the machine in the direction opposite to the feeding movement of the arm. In this manner any play which may take place in the mechanical feeding elements and their links to the machine is made ineffective and the desired vibration-free feeding can take place. By means of this seemingly contradicting measure, namely due to the application of a counterforce against the feeding force, the cutting efficiency is in surprisingly simple manner increased and the edge life of the saw blade is improved.

The cold action circular saw having a saw arm which is swingable against a saw table and the free end of which is linked to the machine base or socket or the like by means of linear mechanical feeding elements movable one against the other, is characterized in that it is provided with a device for generating a counterforce continuously or positively acting against the feeding force. This device according to this invention eliminates play in the feeding elements and also in their hinge joints to the cold circular sawing machine. Preferably, the device of this invention for generating the counterforce is arranged between the two parts which during the sawing action move one against the other and which are provided with hinges for mounting the feeding means.

A particularly simple structure results when a hydraulic cylinder-and-piston unit for generating the counterforce acting against the feeding movement is arranged parallel to a rod-like mechanical feeding element such as for example, a spindle with a nut. The tensioning device for generating the counterforce continuously acting against the movement of the feeding device can be a hydraulic or a pneumatic cylinder-and-piston unit or at least a spring.

A particularly advantageous arrangement results when in a cold circular saw having a saw arm hinged for a feeding movement from above downwardly against a saw table, the tensioning counterforce is larger than a part of the combined force acting in the feeding direction and formed of the weight of the saw arm and of the maximum downwardly directed components of the cutting force. By this means it is in any case prevented that a possible play inside the feeding means and their mounting hinges may become effective.

In a further elaboration of this invention, the device for generating the tension counter force is employed also for resetting the sawblade or for quick return traverse of the saw arm.

The novel features which are considered as characteristic of the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

The single FIGURE shows a schematic side view of a cold action circular sawing machine according to this invention during the cutting of a workpiece.

DESCRIPTION OF THE PREFERRED EMBODIMENTS

In the preferred embodiment, a cold action circular sawing machine or cold circular saw designated generally by reference numeral 1 includes a saw arm 4 supporting a power driven circular saw blade 5 and movable from above downwardly against a saw table 3 to separate a workpiece 2 positioned on the latter. The saw arm 4 is at one end thereof swingably supported in a hinge 6 provided on a machine base 7.

Linear power transmission means in the form of mechanical feeding elements are provided for feeding the saw blade 5 in the direction of the arrow Pf1 to overcome the resistance of workpiece 2. In this exemplary embodiment the feeding mechanism is a screw spindle 8 cooperating with a nut 9. The spindle 8 is upported for rotation at the free end of the saw arm 4 and is driven via a belt transmission 10 by a motor 11. As seen in the drawing the spindle 8 is supported for rotation in a schematically illustrated hinge socket 12 pivotably mounted on the saw arm 4.

The screw spindle 8 engages a nut 9 fixed in a tube 15 which at its lower end is connected to a hinge 13 provided on the machine base 7 or on a stationary socket 14. By rotating the spindle 8 an axial displacement thereof relative to the nut 9 takes place and results in the desired feeding movement. The nut 9 is fixed to the upper end of the tube 15 and the spindle during its rotation enters the tube 15 and consequently its windings are well protected. Furthermore, the sawing machine has a chuck 16 arranged on the saw table 3 for clamping the workpiece 2, and a driving motor 17 mounted on the saw arm for driving the saw blade 5.

According to this invention the cold circular saw 1 is provided with a device, generally denoted by reference numeral 18, for generating a counterforce acting against the feeding direction as indicated by arrow Pf1. This tensioning device 18 is arranged between the movable saw arm 4 and the stationary machine base 3 or socket 14 so that upon application of the counter force the hinges 12 and 13 and the feeding means mounted therebetween are pressed outwardly one away from the other and consequently any possible play in these parts is neutralized.

The essential component part of the tensioning device 18 is a hydraulic cylinder-and-piston unit 19 and 20 hinged by means of hinges 21 and 22 between the machine base 7 or socket 14, and the tiltable saw arm 4 and extending parallel to the rod-like feeding elements 8, 9 and 15. The working cylinder 19 is provided with a single intake conduit 23 for the pressure medium and with a unilaterally loaded piston surface 24. In a particularly simple embodiment matched to the application in the machine of this invention, the end face of the piston rod 20 in the working cylinder 19 is employed as the piston surface so that a separate and snugly fitting piston member can be dispensed with.

The drive 11 and 10 for the mechanical feeding device 8 and 9 is provided with a releasable coupling or a free-wheeling coupling and the like so that tensioning cylinder 19 can act simultaneously as a working cylinder for resetting the saw blade 5 against the direction of the arrow Pf1 and return the saw arm in its starting position, particularly in the case of a quick-return traverse. In this manner the tensioning device 18 of this invention performs a double function and contributes in an advantageous manner to a substantially faster resetting of the saw blade 5 than it can be attained by the mechanical feeding means because the latter have a preset maximum rotational speed which cannot be exceeded. Due to the speed reduction which is necessary for driving the feeding mechanism, even if the permissible maximum rotational speed is employed a relatively low speed of the traverse would result.

In the illustrated embodiment a hydraulic cylinder is used as the tensioning device 18 for the generation of the counter force. Nonetheless, also a pneumatic cylinder and or at least a spring can also be employed instead of the hydraulic unit.

The working cylinder 19 in a preferred embodiment can be employed for performing still another function provided that in the conduit 25 which opens into the working cylinder, in this example through the oil intake port 23, is provided with a control or shut-off element for example a slider or a non-illustrated control valve and the like, for arresting the saw arm 4 with the saw blade 5 in an intermediate position. If by means of this control element the intake port 23 and thus the working cylinder 19 is closed, the instant positions of the piston rod 20 and consequently of the saw arm 4 are fixed. In addition, a brake can be arranged in the range of the coupling (non-illustrated) of the drive 10 so that a backlash which might take place in the working cylinder 19 would not take any effect. Apart from the elimination of the play in the feeding elements and apart from the actuation of the quick return traverse, the device 18 of this invention performs therefore still another function, namely the arresting of the saw arm in an intermediate position.

Finally, it is also possible that in order to feed quickly the saw blade 5 against the workpiece 2, the supply conduit 25 for the pressure medium can be switched off and the medium occurring in the working cylinder 19 is releasable via a valve, particularly via an adjustable throttling valve 27 which is provided in the discharge conduit 26. During the quick feeding action the counterforce normally generated by the device 18 can be in an advantageous manner either increased or reduced.

It can be seen that behind the intake port 23 for admitting the pressure medium in the cylinder 19 a branch conduit 25 and 23 leads to a non-illustrated pressure source such as an oil pump or the like and the conduit 28 leads to the throttle valve 27.

In this embodiment, the device 18 for producing the counterpressure against the feeding means is linked to the end portion E of the saw arm 4 at a distance from the center M of the saw blade 5. This distance is larger than that of the hinge point 12 of the feeding device, whereby both hinges 22 and 12 are arranged at the same free end portion E of the saw arm. The mechanical feeding device 8, 9 is capable of generating a larger force than the counteracting tensioning device 18 and therefore it is arranged on the shorter lever arm so that the lower pressure of the hydraulic cylinder producing the counterforce can act on the longer arm. Nonetheless a reverse arrangement is also possible.

In a further elaboration of this invention it is advantageous when vibrations resulting in the feeding mechanism are separated from the sawing machine proper. For this reason the hinges 13 and 21 for the feeding and, respectively, the tensioning mechanism are anchored by fastening elements 29 in the foundation 30 of the machine 1.

In the sawing machine 1 of this invention, the resistance of material of workpiece 2 against cutting is further supplemented by the tension of the counterforce applied during the cutting process against the feeding elements 8 and 9 when the latter are moving in the direction of arrow Pf1 and this counterforce is generated in the machine 1 itself. As a consequence, any play which may take place in the aforementioned parts and the minute back-and-forth movements of the saw blade 5 and of the saw arm 4 in the pivot 6 are thus eliminated inasmuch as these parts are continuously pushed apart from one another so that the backlash is neutralized in the opposite joints. In the shown embodiments, the counterforce during the sawing operation is applied to the same side of the saw arm 4 relative to the pivot or hinge 6 as is the feeding force which acts in counterdirection. It should be mentioned that the counterforce can be applied also to the saw arm 4 at the opposite side of the pivot 6 whereby the tensioning device moves in the same direction as the feeding device. In the latter case the saw arm 4 is configurated as a two-arm lever.

The play eliminating counterforce is to be kept as small as possible. Nonetheless it should be larger than the combined weight of the saw arm 4 and of the maximum downwardly directed components of the cutting forces acting in the feeding direction.

In summary, there result a sawing machine 1 in which very large forces are applicable by the mechanical feeding device and, therefore, hard metal saws can be employed for cutting materials which normally are difficult for machining. In spite of this a high edge life and a relatively large sawing speed is attained because even a minute play which in mechanical feeding means might lead to vibrations, is by virtue of the device 18 corrected or eliminated. The impacts which always take place due to the penetration of individual teeth in the workpiece are not transmitted on the machine base because an additional damping is provided by the working cylinder 19 and in addition, the hinges of the feeding and tensioning devices are anchored in the foundation.

It will be understood that each of the elements described above, or two or more together, may also find a useful application in other types of constructions differing from the type described above.

While the invention has been illustrated and described as embodied in a specific example of the play eliminating a device of this invention, it is not intended to be limited to the details shown, since various modifications and structural changes may be made without departing in any way from the spirit of the present invention.

What is claimed as new and desired to be protected by Letters Patent is set forth in the appended claims:

1. A method of eliminating play in a cold action circular saw of the type having a machine base adapted for supporting a workpiece, and a swingable saw arm hinged to said base and being adapted for supporting a power driven saw blade and feeding means operable to move said arm at a feeding pressure against said base, comprising the step of exerting a correcting pressure against said arm in a direction opposite to that of said feeding pressure, said correcting pressure being applied to the same side of the hinge of the saw arm as the feeding pressure.

2. A method of eliminating play in a cold action circular saw of the type having a machine base adapted for supporting a workpiece, and a swingable saw arm hinged to said base and being adapted for supporting a power driven saw blade and feeding means operable to move said arm at a feeding pressure against said base, comprising the step of exerting a correcting continuous pressure against said arm in a direction opposite to that of said feeding pressure, said correcting pressure being larger than the combined force formed of the weight of said arm and of the maximum variable components of the cutting force acting in the feeding direction.

3. The method as defined in claim 2 wherein the correcting pressure is applied in the same direction to the opposite side of the hinge of the saw arm than the feeding pressure.

4. A cold circular saw comprising a machine base adapted for supporting a workpiece; a saw arm hinged at one end thereof to said base and being adapted for supporting a power driven saw blade; a linear power transmitting mechanism hinged between said base and said arm to displace under a feeding pressure said arm against said workpiece; and play correcting means hinged between said base and said arm to exert a counter pressure which is sufficient to eliminate play in said arm and said feeding device.

5. The cold circular saw as defined in claim 4, wherein said play correcting means includes another linear power transmitting means including two elements movable in opposite directions relative one to another and hinged between said saw arm and said machine base parallel to said linear power transmitting mechanism.

6. The device as defined in claim 5, wherein said power transmitting mechanism is a rod-like feeding mechanism and said play correcting means is a cylinder-and-piston unit hydraulically driven for exerting said counter pressure.

7. The cold circular saw as defined in claim 6, wherein the working cylinder of said unit has a single intake conduit for a pressure fluid and a unilaterally loaded piston surface.

8. The cold circular saw as defined in claim 7, wherein said working cylinder includes a piston rod defining said piston surface.

9. The cold circular saw as defined in claim 4, wherein said linear power transmitting mechanism for feeding pressure includes a power drive mounted on said saw arm and a releasable coupling means between said power drive and said power transmitting mechanism, and said play correcting means being operable for performing the quick-return traverse of said saw arm into its starting position.

10. The cold circular saw as defined in claim 4, wherein said play correcting means is a pneumatic cylinder-and-piston unit.

11. The cold circular saw as defined in claim 4, wherein said play correcting means is a spring.

12. The cold circular saw as defined in claim 4, wherein said play correcting means is a hydraulic cylinder-and-piston unit including a pressure fluid inlet conduit having control valve for arresting the intermediate position of said saw arm.

13. The cold circular saw as defined in claim 9, further including a brake in the range of said power drive to eliminate the backlash of said power transmitting mechanism during the arrested intermediate position of said arm.

14. The cold circular saw as defined in claim 12, further including the throttle valve arranged downstream of said control valve to release pressure medium from said cylinder.

15. The cold circular saw as defined in claim 14, including a branch conduit for said throttle valve.

16. The cold circular saw as defined in claim 4, wherein said counter pressure is larger than a portion of the combined force formed by the weight of said saw arm and the maximum downwardly directed force component of the cutting force.

17. The cold circular saw as defined in claim 16, wherein said play correcting means are hinged to said saw arm at a greater distance from the center of rotation of said saw blade than is the distance of the hinge for said feeding power transmitting mechanism.

18. The cold circular saw as defined in claim 4, wherein said machine base is provided with a socket and said feeding power transmitting mechanism and said play correcting means are hinged to said socket.

19. The device as defined in claim 4, further including fastening means anchored in the foundation of said machine base, said feeding power transmitting mechanism and said play correcting means being hinged to said fastening means.

* * * * *